United States Patent
Furuyama et al.

(10) Patent No.: US 11,267,064 B2
(45) Date of Patent: Mar. 8, 2022

(54) ARC WELDING CONTROL METHOD (71) Applicant: Panasonic Intellectual Property Management Co., Ltd., Osaka (JP)

(72) Inventors: Yuya Furuyama, Hyogo (JP); Shigeki Yonemori, Hyogo (JP); Atsuhiro Kawamoto, Hyogo (JP); Junji Fujiwara, Osaka (JP); Noriyuki Matsuoka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 477 days.

(21) Appl. No.: 16/326,698

(22) PCT Filed: Aug. 31, 2017

(86) PCT No.: PCT/JP2017/031294
§ 371 (c)(1),
(2) Date: Feb. 19, 2019

(87) PCT Pub. No.: WO2018/043626
PCT Pub. Date: Mar. 8, 2018

(65) Prior Publication Data
US 2019/0176257 A1    Jun. 13, 2019

(30) Foreign Application Priority Data
Sep. 5, 2016 (JP) .............................. JP2016-172895

(51) Int. Cl.
*B23K 9/073* (2006.01)
*B23K 9/173* (2006.01)
(Continued)

(52) U.S. Cl.
CPC ............ *B23K 9/0732* (2013.01); *B23K 9/073* (2013.01); *B23K 9/0735* (2013.01); *B23K 9/09* (2013.01);
(Continued)

(58) Field of Classification Search
CPC .... B23K 9/073; B23K 9/0732; B23K 9/0735; B23K 9/09; B23K 9/092; B23K 9/0956; B23K 9/133; B23K 9/173
See application file for complete search history.

(56) References Cited

U.S. PATENT DOCUMENTS

2008/0314884 A1  12/2008 Fujiwara et al.
2012/0097654 A1   4/2012 Kawamoto et al.
(Continued)

FOREIGN PATENT DOCUMENTS

CN  102581436  7/2012
CN  102596475  7/2012
(Continued)

OTHER PUBLICATIONS

English translation of Search Report dated Apr. 29, 2020 in related Chinese Patent Application No. 201780053830.2.
(Continued)

*Primary Examiner* — Erin E McGrath
(74) *Attorney, Agent, or Firm* — Wenderoth, Lind & Ponack, L.L.P.

(57) ABSTRACT

A method of controlling arc welding with a consumable electrode includes repeating the following periods in sequence: a short-circuit welding period to perform short-circuit arc welding; a pulse welding period to perform pulse welding; and a cooling period in which the welding current output is zero.

12 Claims, 10 Drawing Sheets (51) Int. Cl.
  *B23K 9/09* (2006.01)
  *B23K 9/12* (2006.01)
  *B23K 9/095* (2006.01)
  *B23K 9/133* (2006.01)

(52) U.S. Cl.
  CPC ............ *B23K 9/092* (2013.01); *B23K 9/0956* (2013.01); *B23K 9/124* (2013.01); *B23K 9/133* (2013.01); *B23K 9/173* (2013.01)

(56) References Cited

U.S. PATENT DOCUMENTS

| | | |
|---|---|---|
| 2012/0199567 A1 | 8/2012 | Nakagawa et al. |
| 2014/0203003 A1 | 7/2014 | Fujiwara et al. |
| 2017/0225253 A1 | 8/2017 | Matsuoka et al. |

FOREIGN PATENT DOCUMENTS

| | | |
|---|---|---|
| CN | 102990194 | 3/2013 |
| JP | 62-279087 | 12/1987 |
| JP | 2007-216268 | 8/2007 |
| WO | 2011/004586 | 1/2011 |
| WO | 2013/136643 | 9/2013 |
| WO | 2016/059805 | 4/2016 |

OTHER PUBLICATIONS

Indian Examination Report dated Jan. 1, 2021 in corresponding Indian Patent Application No. 201947008029.
International Search Report of PCT application No. PCT/JP2017/031294 dated Nov. 14, 2017.

The interval Pc of the pulse welding period is not constant

FIG. 8

The interval Pc of the pulse welding period is constant

ARC WELDING CONTROL METHOD

CROSS-REFERENCE TO RELATED APPLICATIONS

This application is a U.S. national stage application of the PCT International Application No. PCT/JP2017/031294 filed on Aug. 31, 2017, which claims the benefit of foreign priority of Japanese patent application No. 2016-172895 filed on Sep. 5, 2016, the contents all of which are incorporated herein by reference.

TECHNICAL FIELD

The present invention relates to a method of controlling arc welding in which an arc is generated between a welding wire, which is a consumable electrode and a base material, which is a welding workpiece.

BACKGROUND ART

It has been desired that the frames of bicycles, motorcycles and automobiles should be welded with beautiful beads with a beautiful wave pattern (hereinafter, scaly beads) in recent years for their sophisticated appearance. Such scaly beads can be obtained by adjusting the heat input to the base material so as to control the bead geometry. One approach to obtain scaly beads is low pulse welding (e.g., Patent Literature 1) in which welding conditions such as welding current and welding voltage are changed at a frequency of several hertz between the peak and base conditions. This approach uses the difference in heat input between the peak and base conditions so as to reduce burn-through and insufficient melting when materials different in thickness are welded together.

Typical examples of the method of arc welding with a consumable electrode for low pulse welding include short-circuit welding and pulse welding, both of which are in practical use but have respective drawbacks.

First, short-circuit welding, in which the welding wire is short-circuited with the base material, makes the arc provide a low heat input to the base material. This is likely to form humped beads or to cause insufficient melting. Furthermore, the arc is so short that the droplet grown at the wire tip during the arc period tends to cause irregular short circuits such as minor short circuits, leading to spattering. Meanwhile, pulse welding provides a lower heat input than spray transfer at a constant current exceeding the critical current. However, the welding has a long arc to maintain stable pulse transfer. This tends to cause undercuts or burn-through in thin-plate welding or gap welding due to failure in the reduction of heat input.

A proposed approach to overcoming the above drawbacks is a method of arc welding in which a short-circuit transfer period and a pulse transfer period are alternated (e.g., Patent Literature 1). A proposed approach to reducing spattering in short-circuit welding is to feed the welding wire in alternating forward and backward directions (e.g., Patent Literature 2).

CITATION LIST

Patent Literature

PTL 1: Japanese Unexamined Patent Application Publication No. 62-279087
PTL 2: Japanese Unexamined Patent Application Publication No. 2007-216268

SUMMARY

Technical Problem

According to a method of arc welding with a consumable electrode in which the short-circuit welding period and the pulse welding period are alternated, if a welding wire as the consumable electrode is fed constantly in both periods, spattering tends to occur when the short circuit is released in the short-circuit welding period.

Patent Literature 2 discloses a method of controlling welding in which the welding wire is fed in forward and backward directions in short-circuit welding. Using this method in the short-circuit welding period enables the wire to be fed in the backward direction when the short circuit is detected and enables the short circuit to be released mechanically. This reduces the current when the short circuit is released, and the occurrence of spattering.

However, when the short-circuit welding period is switched to the pulse welding period or vice versa, the control of the feeding of the wire and/or the control of the welding current are discontinuous, causing unstable welding, spattering, and non-uniform appearance of the scaly beads.

Scaly beads with a clear wave pattern can be obtained when the difference in heat input is large between the high heat input welding condition and the low heat input welding condition. However, if the high heat input welding condition has too high a heat input, burn-through is likely to occur. If the low heat input welding condition has too low a heat input, the arc is likely to be unstable.

Solutions to Problem

In order to solve the above problems, the method of controlling arc welding according to the present invention is a method of controlling arc welding with a consumable electrode. The method includes repeating the following periods in sequence: a short-circuit welding period to perform short-circuit arc welding; a pulse welding period to perform pulse welding; and a cooling period in which a welding current output is zero.

In the method of controlling arc welding according to the present invention, the welding voltage output in the cooling period may be zero.

In the method of controlling arc welding according to the present invention, in the short-circuit welding period, a welding wire as the consumable electrode may be fed in alternating forward and backward directions at a predetermined cycle; and in the pulse welding period, the welding wire may be fed at a constant feed speed.

In the method of controlling arc welding according to the present invention, while the welding wire is fed in alternating forward and backward directions at the predetermined cycle in the short-circuit welding period, the average feed speed of the welding wire may be gradually increased to the constant feed speed set in the pulse welding period.

In the method of controlling arc welding according to the present invention, while the welding wire is fed in alternating forward and backward directions at the predetermined cycle in the short-circuit welding period, the average feed speed of the welding wire may be increased to the constant feed speed set in the pulse welding period and maintained at the constant feed speed.

In the method of controlling arc welding according to the present invention, the pulse welding period starts periodically at a constant interval by adjusting a length of the short-circuit welding period in accordance with a length of time from when feeding of a welding wire as the consumable electrode starts until when a short circuit is detected in the short-circuit welding period.

In the method of controlling arc welding according to the present invention, the length of the short-circuit start welding period may be adjusted by controlling the slope of the average feed speed of the welding wire.

In the method of controlling arc welding according to the present invention, the length of the short-circuit start welding period may be adjusted by changing an inflection point at which an increasing average feed speed of the welding wire is switched to a constant feed speed.

In the method of controlling arc welding according to the present invention, the short-circuit welding period may be started when the preceding torch switch signal is turned on and is continued until a predetermined period of time passes. While a welding wire is fed in alternating forward and backward directions at a predetermined cycle in the short-circuit welding period, the average feed speed of the welding wire may be increased to a constant feed speed set in the pulse welding period so that the pulse welding starts periodically at a constant interval.

In the method of controlling arc welding according to the present invention, further including a second short-circuit welding period between the pulse welding period and the cooling period. At the end of the second short-circuit welding period, the welding wire may be short-circuited to the object to be welded. The length of the second short-circuit welding period may be adjusted in accordance with a length of time from when feeding of a welding wire as the consumable electrode starts until when a short circuit is detected in the short-circuit period so that the pulse welding period starts periodically at a constant interval.

In the method of controlling arc welding according to the present invention, in the second short-circuit welding period, the welding wire may be fed in alternating forward and backward directions at a predetermined cycle while the average feed speed of the welding wire is gradually decreased.

In the method of controlling arc welding according to the present invention, the cooling period may be in the range of 10 msec to 250 msec, both inclusive.

In the method of controlling arc welding according to the present invention, the cooling period at the beginning of welding may be shorter than the cooling period during a welding section in continuous welding.

Advantageous Effects of Invention

A method of controlling arc welding with a consumable electrode repeats a short-circuit welding period, a pulse welding period, and a cooling period in this order so as to repeat short-circuit welding with a low heat input, pulse welding with a high heat input, and cooling with zero heat input. This enables a wide range of heat input control and the precise control of the bead geometry, thereby providing scaly beads with a beautiful wave pattern.

DESCRIPTION OF EXEMPLARY EMBODIMENTS

Exemplary embodiments of the present invention will now be described with reference to FIGS. 1 to 11.

First Exemplary Embodiment

Figure 2:
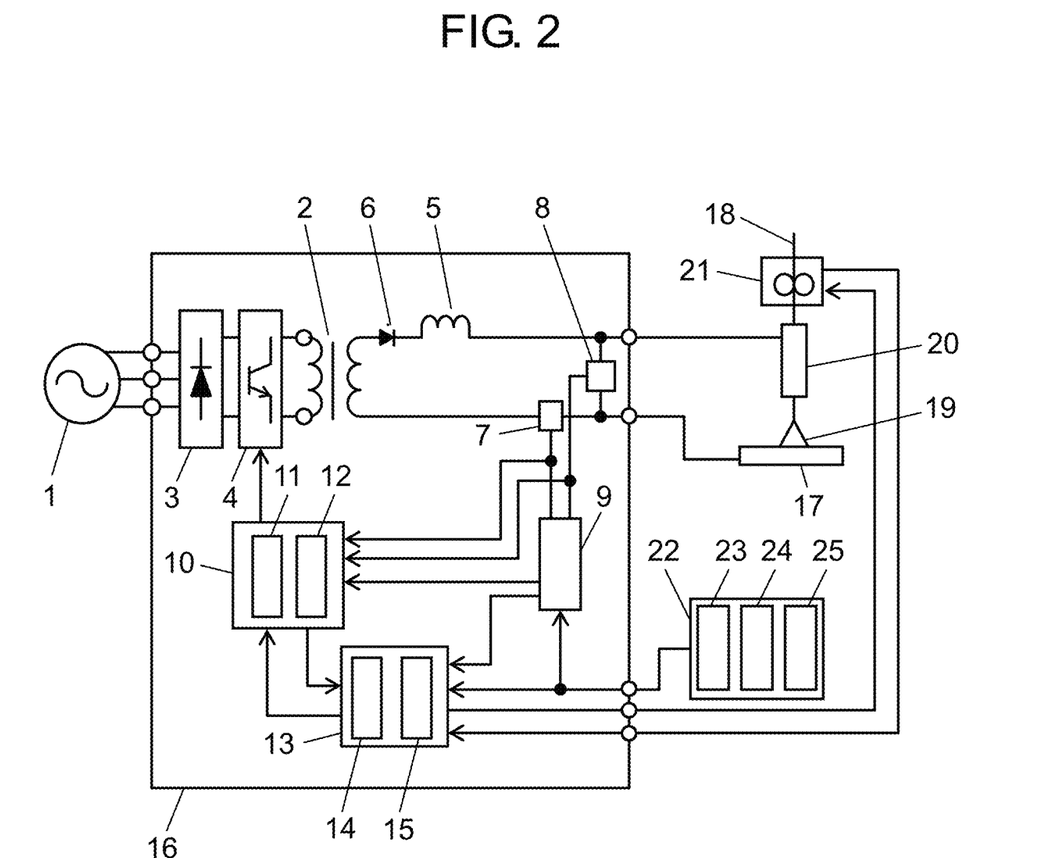
FIG. 2 is a schematic configuration view of an arc welding device in the first exemplary embodiment of the present invention.

First, an arc welding device implementing the method of controlling arc welding in the present exemplary embodiment will be described with reference to FIG. 2. FIG. 2 is a schematic configuration view of arc welding device 16. Device 16 performs welding between welding wire 18, which is a consumable electrode and base material 17, which is the object to be welded by repeating an arc state and a short-circuit state.

Device 16 includes main transformer 2, primary rectifier 3, switching unit 4, direct coal liquefaction (DCL) reactor 5, secondary rectifier 6, welding current detector 7, welding voltage detector 8, control switching unit 9, output controller 10, and wire feed speed controller 13.

Output controller 10 includes short-circuit welding controller 11 and pulse welding controller 12. Wire feed speed controller 13 includes wire feed speed detector 14 and calculator 15. Primary rectifier 3 rectifies the input voltage supplied from input power 1, which is located outside device 16. Switching unit 4 makes the output of primary rectifier 3 suitable for welding. Main transformer 2 transforms the output of switching unit 4 to be suitable for welding.

Secondary rectifier 6 rectifies the output of main transformer 2. DCL reactor 5 smooths the output of rectifier 6 to make the current suitable for welding. Welding current detector 7 detects the welding current. Welding voltage detector 8 detects the welding voltage.

Control switching unit 9 transmits to output controller 10 the timing of switching from the short-circuit welding period to the pulse welding period, and from the pulse welding period to the cooling period. Control switching unit 9, which has a time counting function, counts the predetermined time set by welding condition setter 22, and transmits the timing of switching from one period to another to both output controller 10 and wire feed speed controller 13.

Output controller 10 transmits a control signal to switching unit 4 so as to control the welding output. Short-circuit welding controller 11 controls the short-circuit welding in response to an instruction from control switching unit 9. Pulse welding controller 12 controls pulse welding in response to an instruction from control switching unit 9.

Wire feed speed controller 13 makes wire feeder 21 control the feed speed of welding wire 18. Wire feed speed detector 14 detects the wire feed speed. Calculator 15 calculates the amount of wire 18 fed so far, based on the signal from wire feed speed detector 14.

Arc welding device 16 is connected to wire feeder 21 and welding condition setter 22. Welding condition setter 22, which is used to set welding conditions to device 16, includes short-circuit welding setter 23, pulse welding setter 24, and cooling period setter 25. Wire feeder 21 controls the feeding of wire 18 based on the signal from wire feed speed controller 13.

The welding output of device 16 is supplied to wire 18 via welding tip 20 when a torch switch (not shown) is turned on. The welding output of device 16 generates arc 19 between wire 18 and base material 17 so that welding is performed.

The operation of arc welding device 16 structured as above will be described with reference to FIG. 1.

Figure 1:
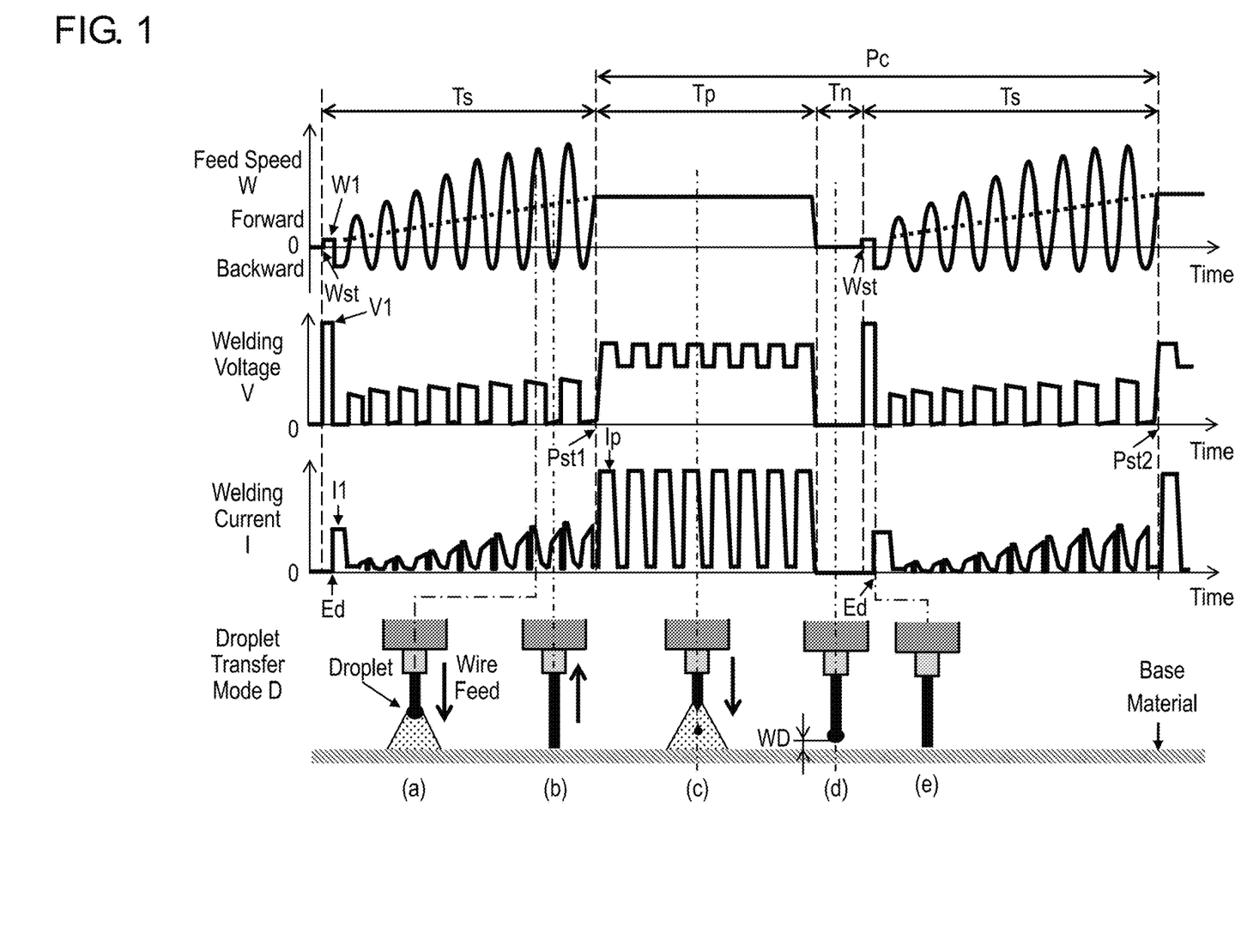
FIG. 1 is a diagram showing a feed speed W of a welding wire, a welding voltage V, a welding current I, and a droplet transfer mode D in a first exemplary embodiment of the present invention.

FIG. 1 is a diagram showing output waveforms in the method of controlling arc welding with a consumable electrode according to the present exemplary embodiment. The arc welding is performed by repeating a short-circuit welding period Ts, a pulse welding period Tp, and a cooling period Tn. The waveforms show the temporal changes in the feed speed W of wire 18, the welding voltage V, the welding current I, and the droplet transfer mode D at the wire tip in the arc welding.

First, the feeding of wire 18 is started at a feed speed W1 at a time point Wst when an instruction is given to start welding. Next, short-circuit welding is started either at the point Wst or at a time point Ed when a short circuit is detected between wire 18 and base material 17. The welding output is controlled by short-circuit welding controller 11 under the conditions set by short-circuit welding setter 23. When a predetermined time Ts previously set by short-circuit welding setter 23 passes, control switching unit 9 switches from short-circuit welding to pulse welding. Subsequently, pulse welding controller 12 controls the welding output under the conditions set by pulse welding setter 24. As a result, pulse welding is started at pulse welding start time points Pst (Pst1, Pst2), and the peak current and the base current are alternated. When a predetermined time Tp previously set by pulse welding setter 24 passes, control switching unit 9 switches from the pulse welding period to the cooling period. During a predetermined time Tn set by cooling period setter 25, the output of output controller 10 is blocked. This enables the heat input from the arc to be zero. One circulation cycle including the short-circuit welding period Ts, the pulse welding period Tp, and the cooling period Tn appearing in this order is repeated to produce a scaly bead.

When the short-circuit welding period Ts, the pulse welding period Tp, and the cooling period Tn are thus combined, the cooling period Tn with zero heat input comes after the pulse welding period Tp with a high heat input as shown in FIG. 1. This sequence provides high cooling effect and the largest difference in heat input, thereby achieving scaly beads with a clear wave pattern. In the cooling period Tn, if the outputs of the welding current and the welding voltage are zero, the heat input can be zero, providing best cooling performance. Meanwhile, if the welding current is zero and the welding voltage remains applied, the no-load voltage can be maintained, followed by smooth arc start. The time from the pulse welding start time point Pst1 in one circulation cycle to the pulse welding start time point Pst2 in the next circulation cycle is referred to as an interval Pc of the pulse welding period Tp. As the interval Pc is longer, the wave pattern becomes coarser, and as the interval Pc is shorter, the pattern becomes denser.

If an arc occurs in the pulse welding period Tp and no molten weld pool is formed immediately below the arc, the droplet of wire 18 is blown off, causing spattering at a pulse peak current Ip. To avoid this, the short-circuit welding period Ts comes before the pulse welding period Tp. This enables forming a molten weld pool immediately below the arc when the short-circuit welding period Ts is switched to the pulse welding period Tp, thereby reducing spattering due to the pulse current.

At the arc start in the short-circuit welding period Ts, as shown in FIG. 1, a no-load voltage V1, which is higher than the welding voltage in the pulse welding period Tp, is outputted. In addition, wire 18 is fed at the constant feed speed W1 until it is short circuited to base material 17 and the current is detected. The welding current I1 after the current detection is higher than the welding current when the short circuit is released. The welding current I1 is outputted for a predetermined period of time. During this period of time, wire 18 is fed in the backward direction at a predetermined amplitude. After the short circuit is released, wire 18 is fed at a predetermined amplitude and frequency in alternating forward and backward directions. FIG. 1 shows a sinusoidal waveform with which to feed the wire, but may alternatively be any other periodical waveform, such as a trapezoidal waveform (not shown). The frequency (cycle) can be constant or variable. It would be easy to manage the feeding of a wire at a constant feed speed with no predetermined amplitude or frequency; however, spattering would be likely to occur due to the electromagnetic pinch force when the short circuit is released. Meanwhile, feeding wire 18 mechanically in forward and backward directions at the predetermined amplitude and frequency can reduce spattering when the short circuit is released in the short-circuit welding period Ts.

The droplet transfer mode D in this case is shown in steps (a) to (e) in FIG. 1. The step (a) shows a state in an arc period in the short-circuit welding period Ts. In this step, wire 18 is fed in the forward direction while an arc is generated. The step (b) shows a state in a short-circuit period in the short-circuit welding period Ts. In this step, the droplet at the wire tip is transferred to base material 17 and then the wire is fed in the backward direction to mechanically accelerate the opening of the short circuit. In the pulse welding period Tp, wire 18 is fed at a constant speed suitable for the welding current set by pulse welding setter 24. As shown in the step (c), the droplet is removed from the wire tip while the peak current and the base current are being alternated. In the cooling period Tn coming after the pulse welding period Tp, as shown in the step (d), the feeding of wire 18 is in the stopped state. At this moment, the distance between the wire tip and the base material 17 is referred to as WD. After the cooling period Tn passes, the subsequent circulation cycle is performed. As shown in the step (e), after wire 18 comes into contact with base material 17 and the current is detected, the short-circuit welding period Ts in the next circulation cycle is started. Thus, the arc maintained over the short-circuit welding period Ts and the pulse welding period Tp disappears in the cooling period Tn. When another arc is generated to start the short-circuit welding period Ts in the next circulation cycle, spattering is likely to occur due to the electromagnetic pinch force when the short circuit is released at the beginning of the arc. However, in the short-circuit welding period Ts in the present invention, wire 18 is fed mechanically in forward and backward directions. This can prevent spattering when the short circuit is released at the beginning of the arc. Thus, in the short-circuit welding period Ts, wire 18 can be fed in forward and backward directions to mechanically open the short circuit to reduce spattering due to the electromagnetic pinch force.

Figure 3:
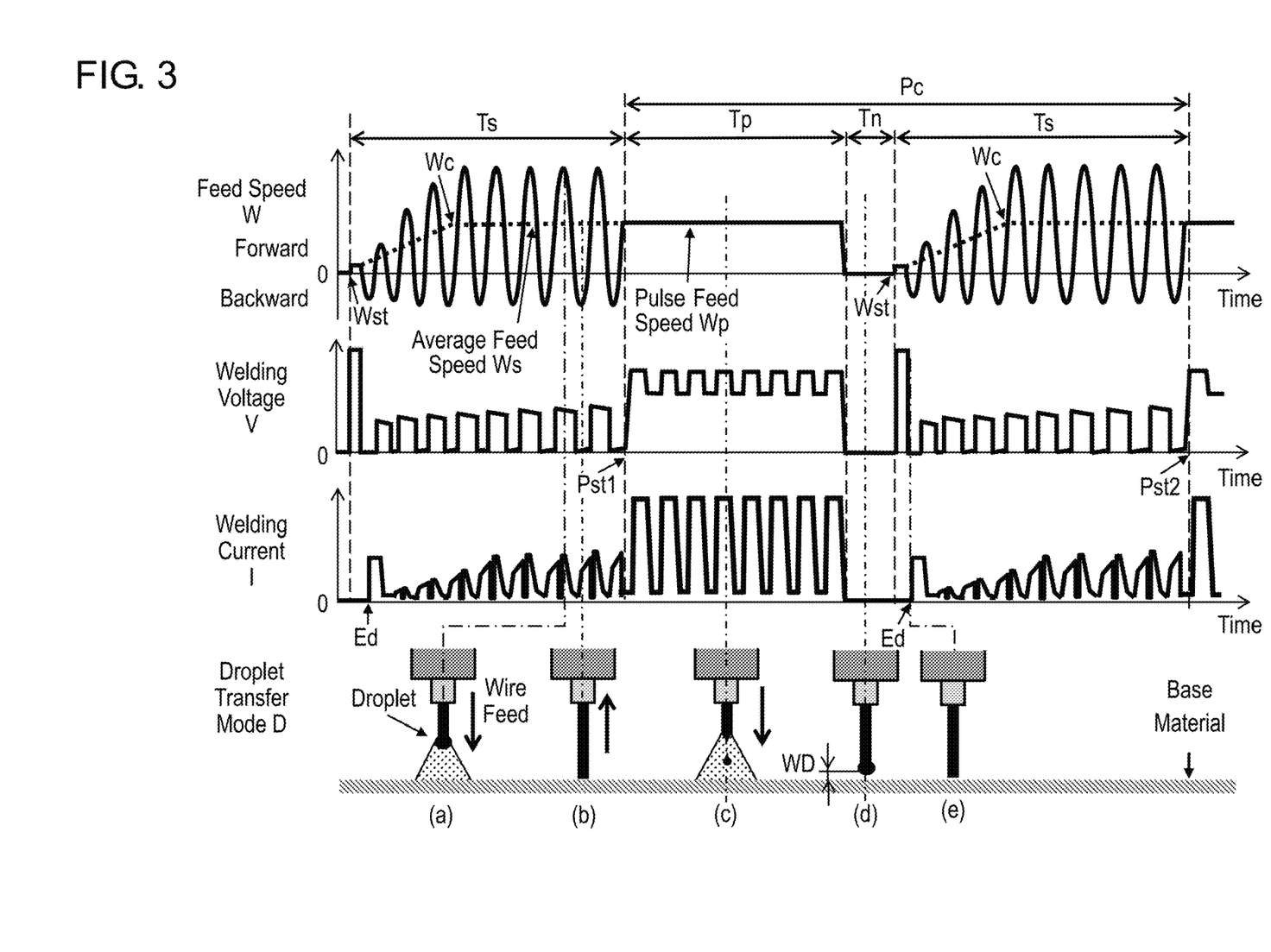
FIG. 3 is a diagram showing the feed speed W of the welding wire, the welding voltage V, the welding current I, and the droplet transfer mode D in the first exemplary embodiment of the present invention.

As shown in FIG. 1, the welding current I and the feed speed W fluctuate all the time in the short-circuit welding period Ts. In particular, the average feed speed of wire 18 gradually increases toward the feeding amount predetermined by the welding conditions in the pulse welding period Tp. As shown in the waveform of the feed speed W in FIG. 3, in the short-circuit welding period Ts, the short-circuit welding period Ts has an average feed speed Ws, which can be maintained after reaching a constant feed speed equal to a pulse feed speed Wp. The inflection point at which the average feed speed Ws reaches the constant feed speed is referred to as Wc. The inflection point Wc is controlled to be in the short-circuit welding period Ts such that the average feed speed Ws reaches the pulse feed speed Wp before the short-circuit welding is switched to pulse welding. This enables smooth switching of the feed speed W of wire 18 and the welding current I with no discontinuity when the short-circuit welding is switched to pulse welding, thereby reducing spattering and stabilizing the arc.

Welding is performed by repeating the circulation cycle including the short-circuit welding period Ts, the pulse welding period Tp, and the cooling period Tn appearing in this order. In this welding, the length of each of the short-circuit welding period with a low heat input, the pulse welding period with a high heat input, and the cooling period with a zero heat input can be adjusted so as to widely control the heat input to base material 17, thereby achieving a more precise control of weld bead geometry.

In the short-circuit welding period Ts, wire 18 is fed at the predetermined amplitude and frequency, but may alternatively be fed at a constant speed for easier management.

In the pulse welding period Tp, wire 18 is fed at the constant speed, but may alternatively be fed at a varying speed.

In the short-circuit welding period Ts, the average feed speed Ws is increased to be equal to the constant feed speed set in the pulse welding period Tp. Alternatively, however, the average feed speed Ws at the end of the short-circuit welding period Ts may be different from the constant feed speed set in the pulse welding period Tp.

Second Exemplary Embodiment

Figure 4:
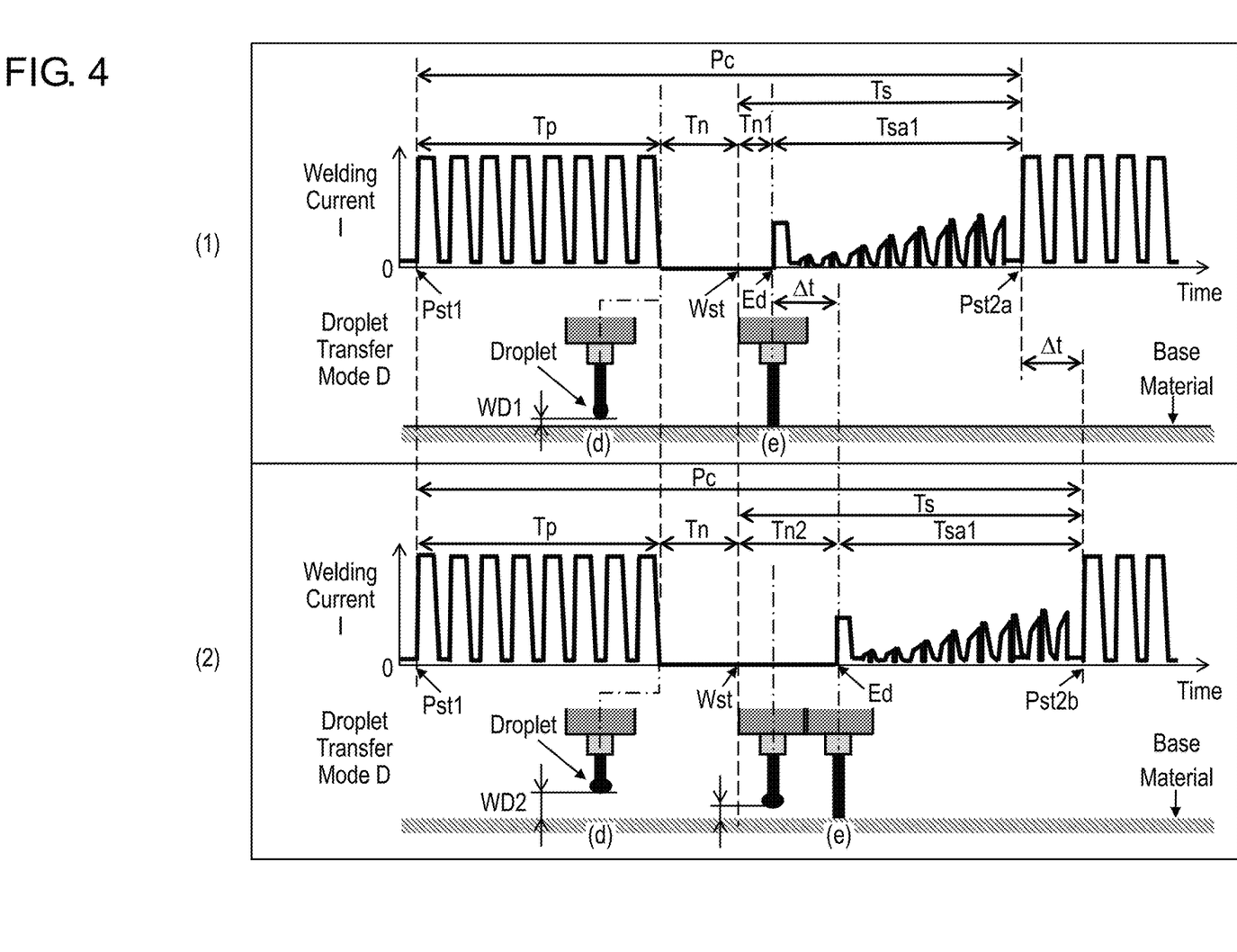
FIG. 4 is a diagram showing a welding current I and a droplet transfer mode D in a second exemplary embodiment of the present invention.

In the second exemplary embodiment of the present invention, like components are labeled with like reference numerals with respect to the first exemplary embodiment, and these components are not described again in detail. The second exemplary embodiment will now be described with reference to FIG. 4. FIG. 4 is a diagram showing a welding current I and a droplet transfer mode D in the second exemplary embodiment. The second exemplary embodiment differs from the first exemplary embodiment in that the length of the short-circuit welding period Ts is changed according to the length of the preceding cooling period Tn.

The droplet at the wire tip at the end of the pulse welding period Tp may be in the state (1) or (2) of the droplet transfer mode D shown in FIG. 4, depending on the welding phenomena. For this reason, the distance between the wire tip and base material 17 is not constant and can be, for example, WD1 or WD2. As a result, the period from the point Wst to the point Ed fluctuates such as time Tn1 and time Tn2. The point Wst is when the instruction to start short-circuit welding in the next circulation cycle is executed, or in other words, when the feeding of wire 18 is started to start the short-circuit welding. The point Ed is when the wire tip comes into contact with base material 17 and the welding current is detected, or in other word, when the short-circuit current is detected. As a result, the timing of starting the short-circuit welding is delayed, and also the timing of switching to the subsequent pulse welding is also delayed. This causes the pulse welding start time point to be delayed from Pst2a to Pst2b. The interval Pc from the pulse welding start time point Pst1 to the pulse welding start time point Pst2 (Pst2a, Pst2b) in the next circulation cycle is no longer constant. A comparison between the diagrams (1) and (2) of FIG. 4 indicates that the interval Pc fluctuates by a time Δt.

Figure 7:
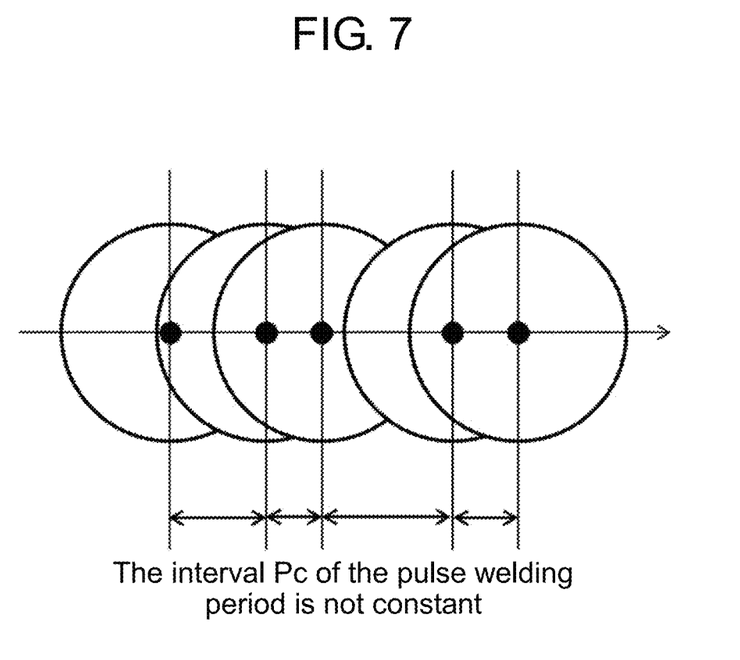
FIG. 7 shows a weld bead appearance in the second exemplary embodiment of the present invention.
Figure 8:
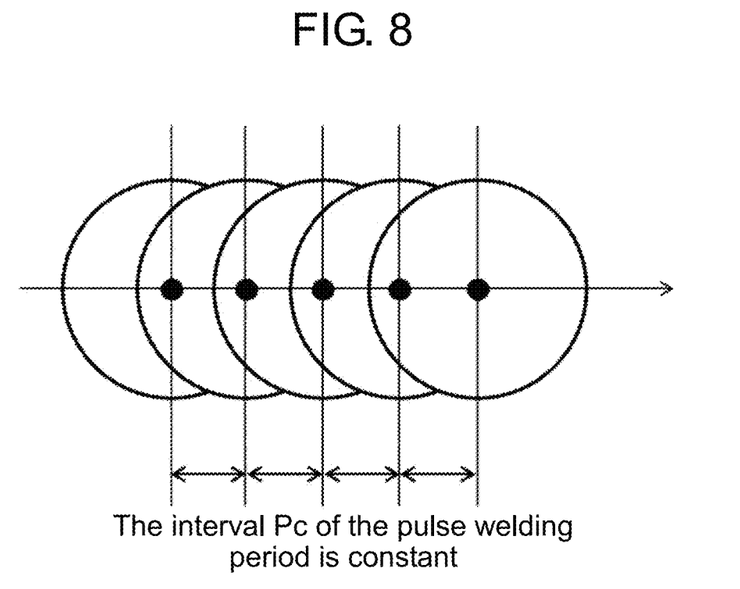
FIG. 8 shows another weld bead appearance in the second exemplary embodiment of the present invention.

As shown in FIGS. 7 and 8, a scaly bead with a wave pattern is formed by repeating the following operations: forming a circular bead in the pulse welding period Tp with a high heat input; and cooling the bead both in the short-circuit welding period Ts with a lower heat input and in the cooling period Tn with a zero heat input. If the interval Pc of the pulse welding period fluctuates as shown in FIG. 4, the scaly bead has a non-uniform wave pattern with different densities as shown in FIG. 7, thus spoiling the appearance.

In order to make the interval Pc of the pulse welding period constant, the length of the short-circuit welding period Ts can be changed according to the length of the preceding cooling period, thereby achieving a scaly bead with a uniform pattern. For example, in the case of (1) in FIG. 5, the short-circuit welding period Ts includes a short-circuit start welding period Tsa1. The short-circuit welding period Ts is made equal to the sum of the period Tsa1 and the time Tn1 from the point Wst at which to start short-circuit welding to the current detection point Ed. In the case of (2) in FIG. 5, the short-circuit welding period Ts includes a short-circuit start welding period Tsa2. The short-circuit welding period Ts is made equal to the sum of the period Tsa2 and the time Tn2 from the point Wst to the current detection point Ed. In shirt, the length of the short-circuit welding period Ts is equal between (1) and (2) of FIG. 5. Hence, even if the distance between the wire tip and base material 17 at the end of the pulse welding period Tp in the droplet transfer mode D fluctuates such as WD1 or WD2, it becomes possible to maintain the constant interval Pc from the pulse welding start time point Pst1 to the pulse welding start time point Pst2 (Pst2a) in the next circulation cycle.

Figure 5:
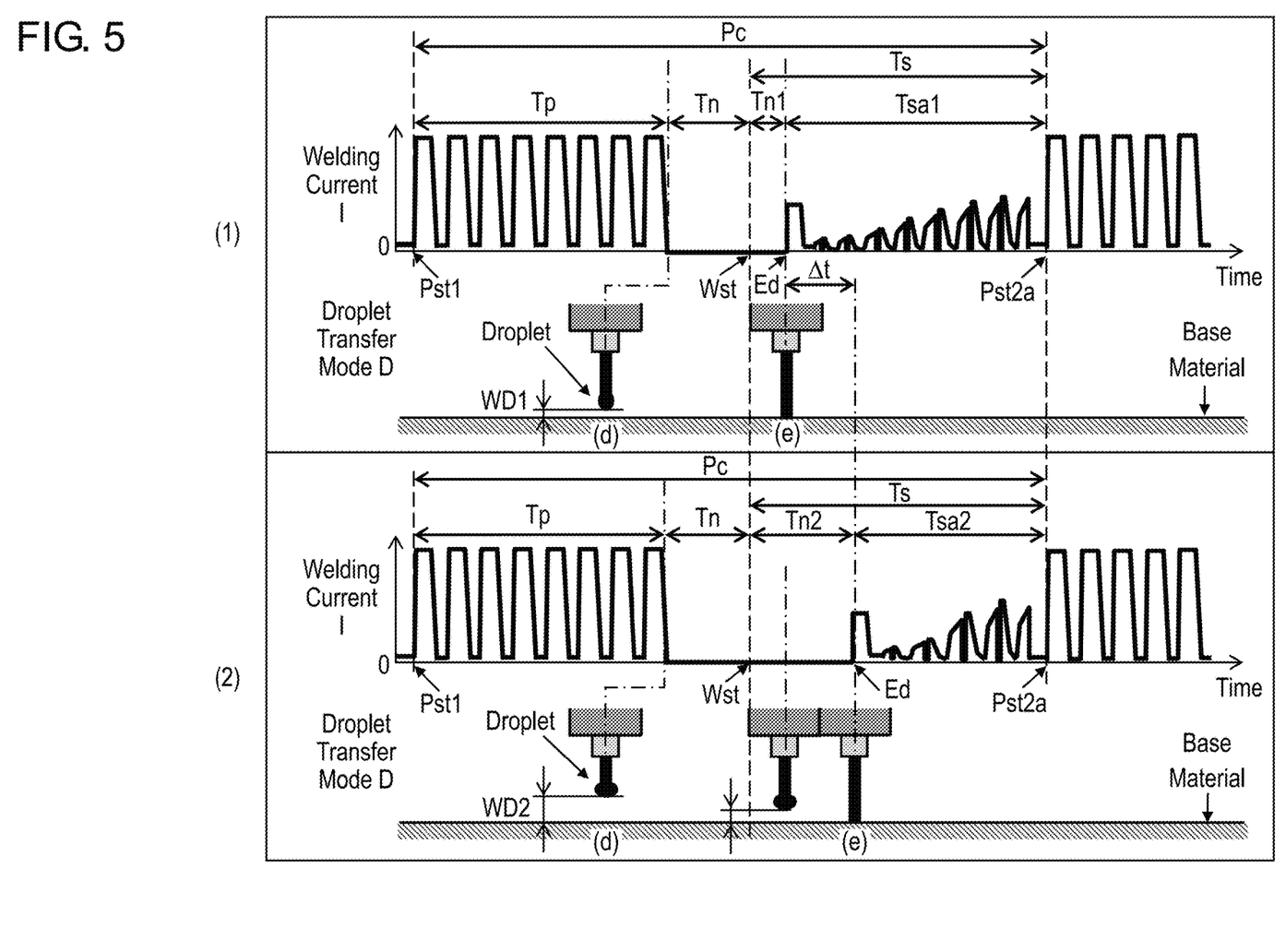
FIG. 5 is a diagram showing the welding current I and the droplet transfer mode D in the second exemplary embodiment of the present invention.
Figure 6:
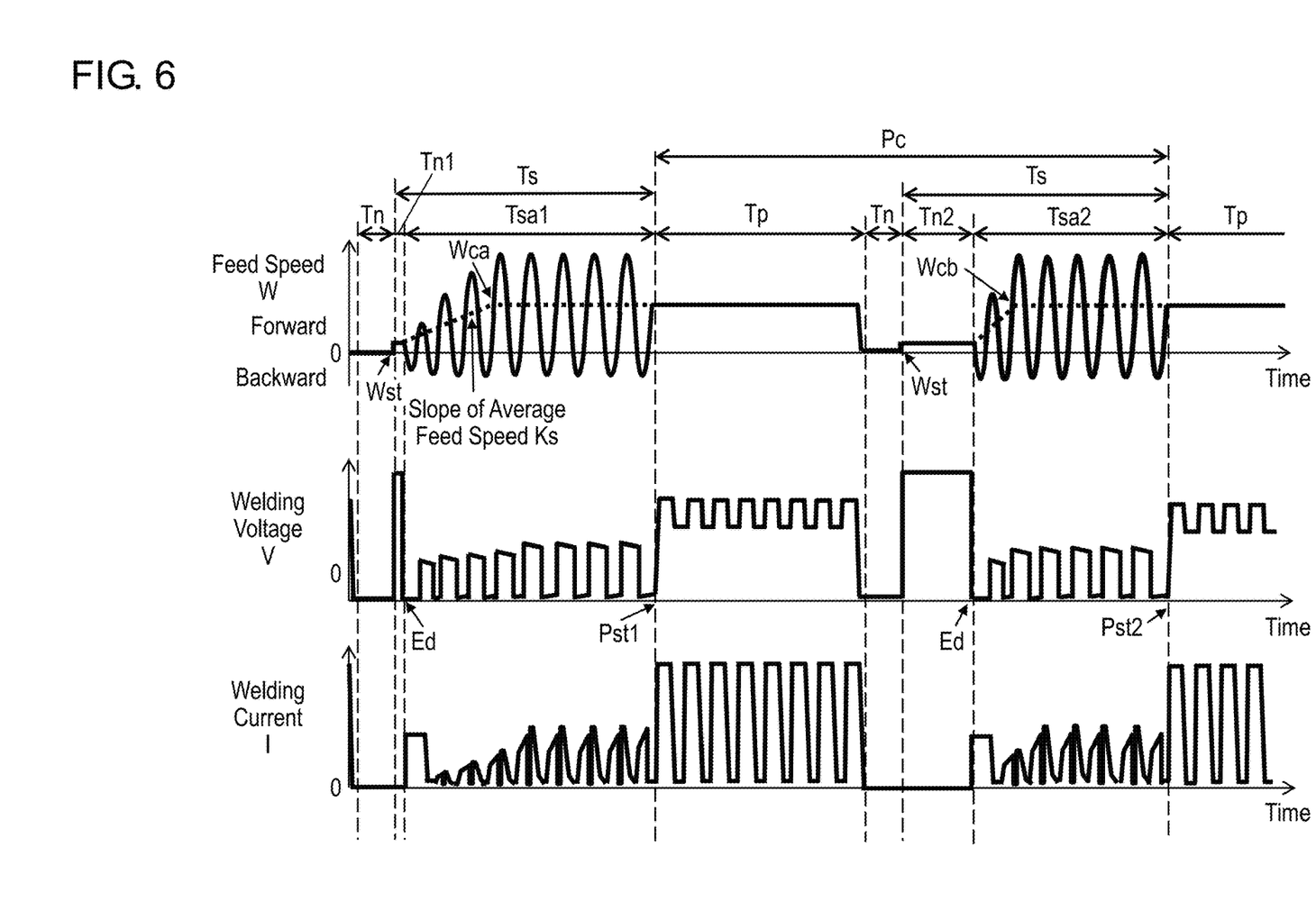
FIG. 6 is a diagram showing the feed speed W of the wire, the welding voltage V, and the welding current I in the second exemplary embodiment of the present invention.

In this case, as shown in FIG. 5, the fluctuations in the time Tn1 from the point Wst at which to start short-circuit welding to the current detection point Ed are absorbed by adjusting the short-circuit start welding periods Tsa1 and Tsa2 in the short-circuit welding period Ts. If the fluctuations are large, the feed speed of wire 18 in the short-circuit welding period Ts may fail to reach the constant feed speed set in the pulse welding period Tp. To avoid this, as shown in FIG. 6, the average feed speed of wire 18 in the short-circuit welding period Ts may have a slope Ks so that the average feed speed can reach the constant feed speed set in the pulse welding period Tp before the pulse welding start time point Pst1. This prevents the feed speed of wire 18 from being discontinuous at the transition from one period to another, allowing the interval Pc of the pulse welding period to be constant. Alternatively, the inflection point at which the increasing average feed speed is switched to the constant feed speed as shown in FIG. 6 can be changed to a point Wca or Wcb. This prevents the feed speed of wire 18 from being discontinuous at the transition from one period to another, allowing the formation of a scaly bead with a uniform wave pattern as shown in FIG. 8.

Third Exemplary Embodiment

Figure 9:
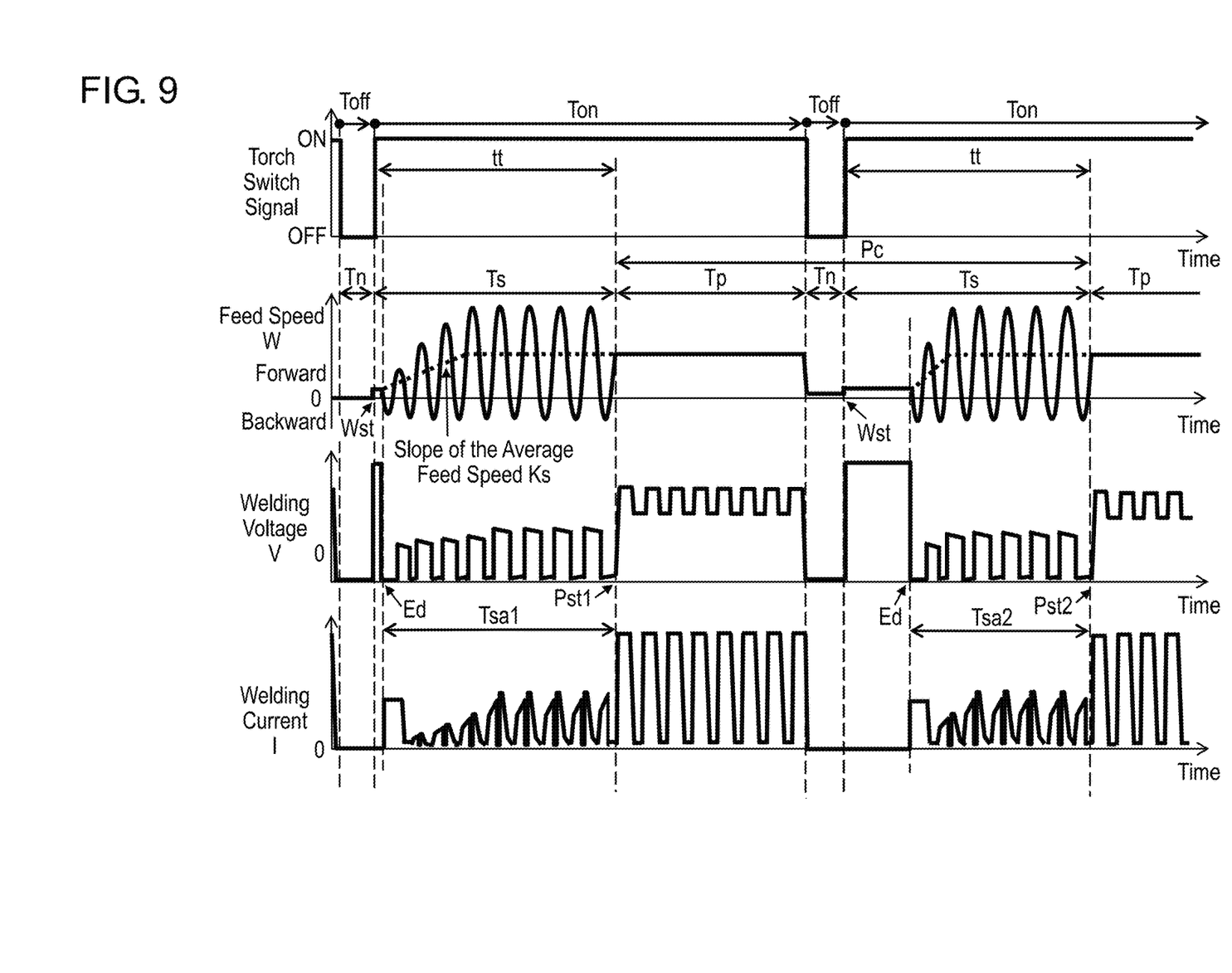
FIG. 9 is a diagram showing a torch switch signal, a welding voltage V, and a welding current I in a third exemplary embodiment of the present invention.

In a third exemplary embodiment of the present invention, like components are labeled with like reference numerals with respect to the first and second exemplary embodiments, and these components are not described again in detail. The third exemplary embodiment will now be described with reference to FIG. 9. FIG. 9 is a diagram showing a torch switch signal, a feed speed W of wire 18, a welding voltage V, and a welding current I in the third exemplary embodiment. The third exemplary embodiment differs from the first and second exemplary embodiments in that the short-circuit welding period Ts is switched to the pulse welding period Tp when a predetermined time tt has passed since the preceding torch switch signal was turned on so as to form a scaly bead with a uniform wave pattern.

As described in the second exemplary embodiment, fluctuating in the distance WD between the wire tip and base material 17 as shown in FIG. 4 results in a scaly bead with a non-uniform wave pattern as shown in FIG. 7. This problem can be solved as follows. As shown in FIG. 9, time counting is started when the torch switch signal is turned on, and short-circuit welding is switched to pulse welding when the predetermined time tt passes. When the pulse welding period Tp passes, the torch switch signal is turned off. When the torch switch signal is turned off, time counting is started. When the predetermined time Tn passes, the torch switch signal is turned on. In this case, even if the distance between wire 18 and base material 17 fluctuates, and the time from the point Wst at which to start feeding wire 18 to the current detection point Ed fluctuates, the short-circuit welding period Ts from the point Wst at which to start feeding wire 18 to the pulse welding start time points Pst1 and Pst2 is always the same. As a result, the interval Pc of the pulse welding period is constant, allowing the scaly bead to have a uniform wave pattern as shown in FIG. 8. Furthermore, the torch switch signal is turned on and off by counting the elapsed time. This allows setting the cooling period Tn and the short-circuit welding period Ts to ease the management of welding procedure.

Fourth Exemplary Embodiment

Figure 10:
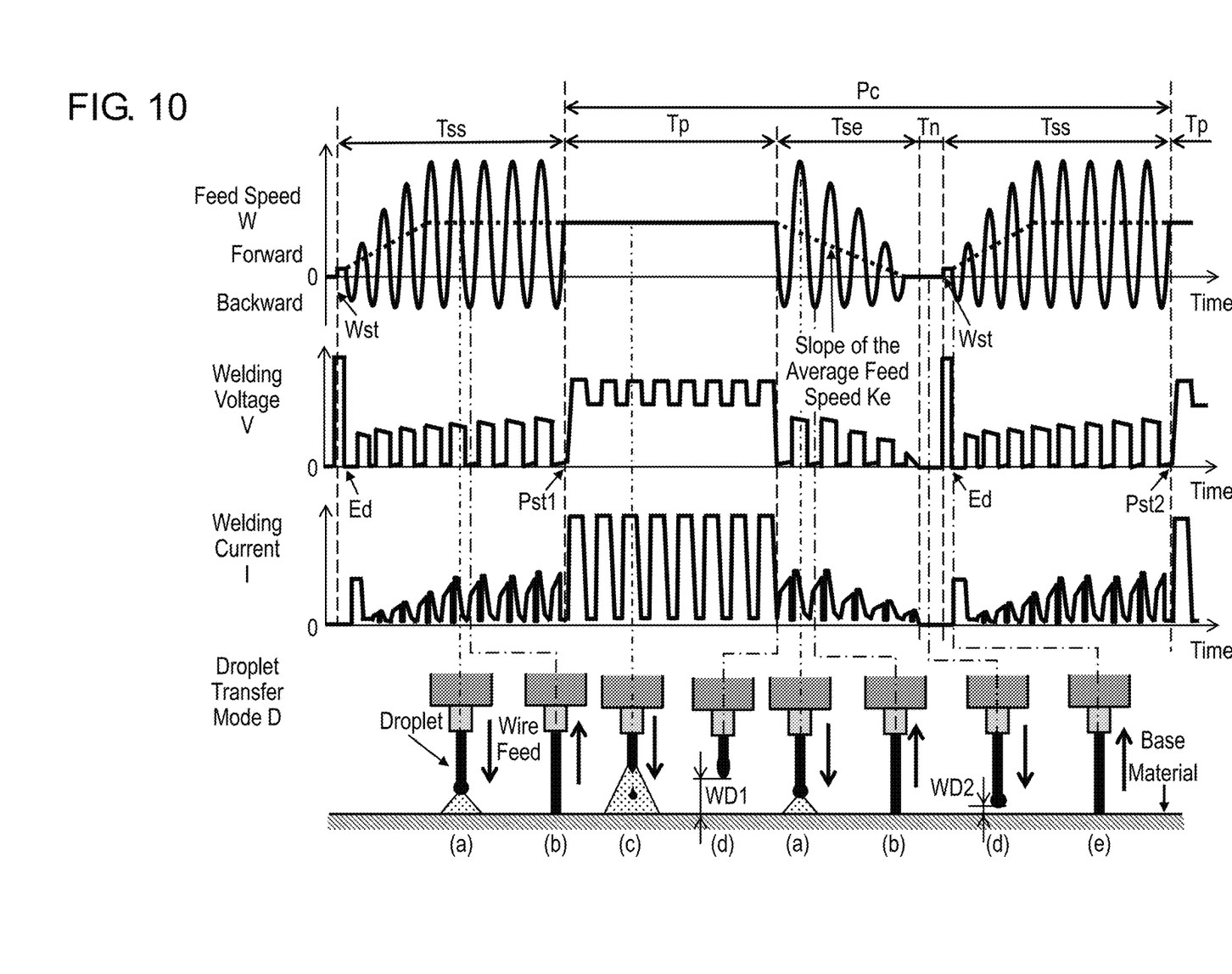
FIG. 10 is a diagram showing a feed speed W of the wire, a welding voltage V, a welding current I, and a droplet transfer mode D in a fourth exemplary embodiment of the present invention.

In a fourth exemplary embodiment of the present invention, like components are labeled with like reference numerals with respect to the first to third exemplary embodiments, and these components are not described again in detail. The fourth exemplary embodiment will now be described with reference to FIG. 10. FIG. 10 is a diagram showing a feed speed W of wire 18, a welding voltage V, a welding current I, and a droplet transfer mode D in the fourth exemplary embodiment. The fourth exemplary embodiment differs from the first to third exemplary embodiments in including a second short-circuit welding period Tse between the pulse welding period Tp and the cooling period Tn. The period Tse is a short-circuit welding period that follows the pulse welding period Tp. In other words, welding is performed by repeating a circulation cycle including a short-circuit welding period Tss; the pulse welding period Tp; the second short-circuit welding period Tse, and the cooling period Tn appearing in this order.

In the second short-circuit welding period Tse, in the same manner as in the short-circuit welding period Tss, wire 18 may be fed at a predetermined amplitude and frequency in alternating forward and backward directions.

Short-circuit welding has a shorter arc than in pulse welding, allowing the distance WD between the wire tip and base material 17 to be short at the end of welding, thereby reducing fluctuations in the cooling period Tn. As shown in the step (d) of the droplet transfer mode D in FIG. 10, the distance WD2 at the end of the second short-circuit welding period Tse is shorter than the distance WD1 at the end of the pulse welding period Tp. Therefore, reducing the time from the point Wst at which to start feeding wire 18 to the current detection point Ed can reduce the fluctuations in the length of the cooling period Tn. This makes the interval Pc of the pulse welding period constant, thereby achieving a scaly bead with a uniform wave pattern. In this case, the average feed speed of wire 18 in the second short-circuit welding period Tse may be gradually decreased with a slope Ke. The output of the welding current I is blocked after the last arc is detected. The slope Ke of the average feed speed is decreased such that short-circuiting and arcing are repeated one to five circulation cycles within the second short-circuit welding period Tse. If the period Tse is too long, the heat input increases, causing the scaly bead to have an unclear wave pattern.

The short-circuit welding period Tss, the pulse welding period Tp, the second short-circuit welding period Tse, and the cooling period Tn are repeated in this order as described above so as to make the interval Pc of the pulse welding period constant, thereby achieving a scaly bead with a clear uniform wave pattern.

The length of the second short-circuit welding period Tse can be adjusted according to the length of the short-circuit welding period Tss and/or the second short-circuit welding period Tse such that the interval Pc of the pulse welding period is strictly constant. Furthermore, the slope Ke of the average feed speed can be changed according to the length of the second short-circuit welding period Tse.

Fifth Exemplary Embodiment

Figure 11:
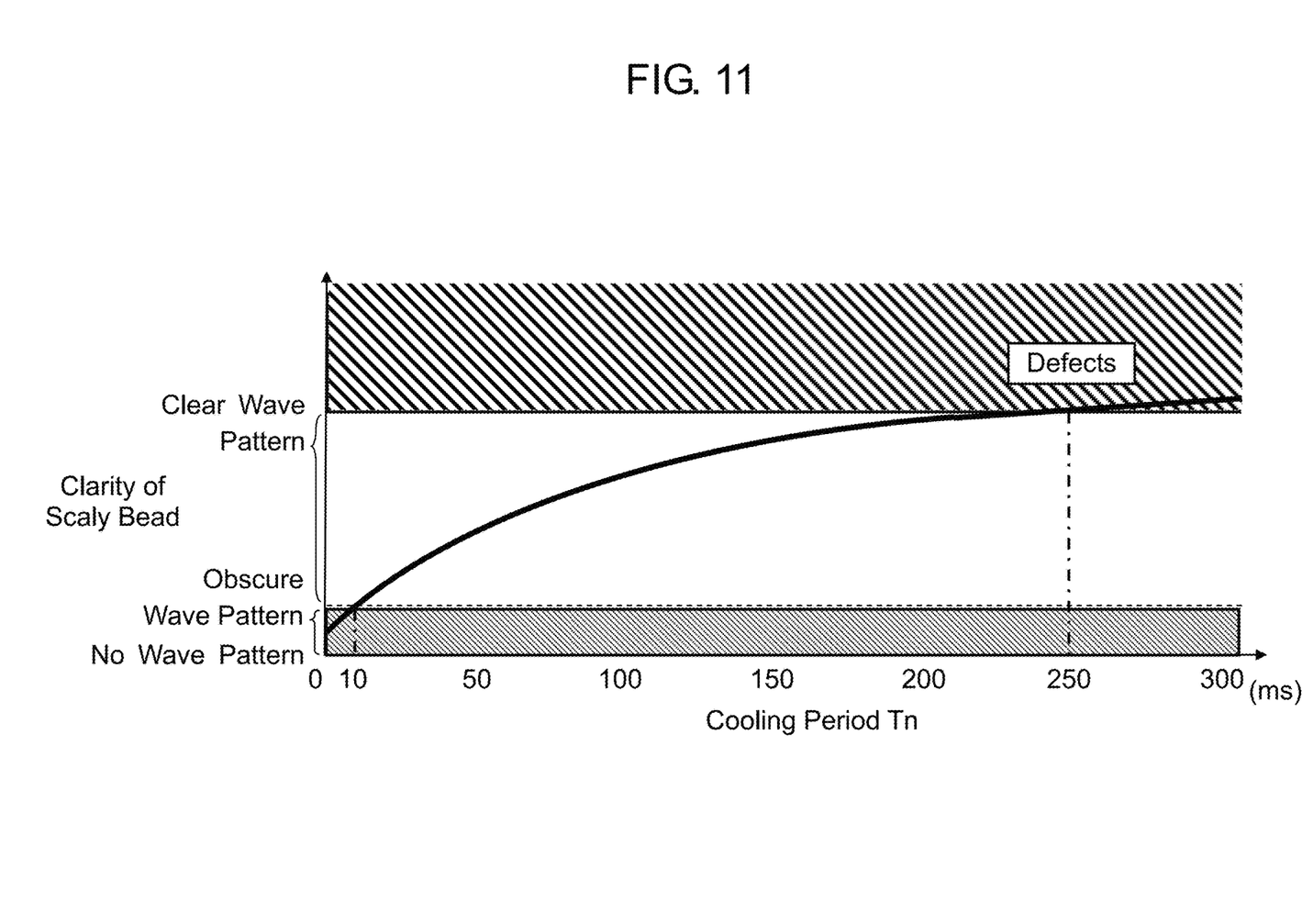
FIG. 11 is a diagram showing changes in the clarity of a scaly bead and the occurrence of defects with the changing length of a cooling period Tn in a fifth exemplary embodiment of the present invention.

In the fifth exemplary embodiment of the present invention, like components are labeled with like reference numerals with respect to the first to fourth exemplary embodiments, and these components are not described again in detail. The fifth exemplary embodiment will now be descried with reference to FIGS. 1 and 11. FIG. 11 is a diagram showing changes in the clarity of a scaly bead and the occurrence of defects with the changing length of the cooling period Tn shown in FIG. 1. The fifth exemplary embodiment differs from the first to fourth exemplary embodiments in that the clarity of the scaly bead is changed by changing the length of the cooling period Tn.

As the cooling period Tn is longer, the cooling effect gets higher as shown in FIG. 11. However, when the cooling period exceeds 250 ms, the welding current is stopped too long, thereby increasing the degree and amount of cooling. This relatively increases the rate of solidification of the molten metal, preventing the release of gas through the holes of the molten metal during aluminum welding, thereby causing weld defects such as pits and blowholes.

Meanwhile, when the cooling period Tn is less than 10 ms, the cooling effect is inefficient, causing the scaly bead to have an unclear wave pattern. Consequently, the cooling period Tn is preferably in the range of 10 ms to 250 ms, both inclusive. Assume that the circulation cycle including the periods Ts, Tp, and Tn appearing in this order or the circulation cycle including the periods Ts, Tp, Tse, and Tn appearing in this order is repeated a plurality of times in the above-mentioned range. In continuous welding such as repeating such circulation cycle a plurality of times, the cooling period Tn is extended during the welding section so as to increase the cooling effect, thereby achieving a scaly bead with a clear wave pattern. Meanwhile, in a circulation cycle at the start of welding, the heat input is difficult to be applied to base material 17. Hence, the cooling period Tn is preferably made shorter than in a circulation cycle during the welding section in continuous welding in which the circulation cycle is repeated a plurality of times so as to reduce the cooling effect. This can relatively increase the heat input at the start of welding.

The length of the cooling period in a circulation cycle at the start of welding is preferably in the range of 20% to 60%, both inclusive, and particularly preferably in the range of 30% to 50%, both inclusive, of the length of the cooling period in a circulation cycle during the welding process in the continuous welding. If the length of the cooling period in the circulation cycle at the start of welding is less than 20% of that of the cooling period in the circulation cycle during the welding process, the cooling effect is too small and the heat input is too large in the circulation cycle at the start of welding, causing the scaly bead to have an unclear wave pattern at the start of welding.

Meanwhile, if the length of the cooling period exceeds 60% at the start of welding, the cooling performance is too high and the heat input is too small, thereby preventing the settlement of the bead. Hence, in the above mentioned range, bead settlement and greater penetration of the bead can be achieved.

Furthermore, it is possible to use the mechanism shown in the second to fourth exemplary embodiments to make the fluctuations of the cooling period Tn absorbed by adjusting the length of the short-circuit welding period, thereby making the interval Pc of the pulse welding constant.

INDUSTRIAL APPLICABILITY

The method of controlling arc welding with a consumable electrode according to the present invention repeats a short-circuit welding period, a pulse welding period, and a cooling period. In the cooling period, the heat input is zero so as to widely control the heat input. Furthermore, in the short-circuit welding period, the welding wire is fed in forward and backward directions. This reduces the spattering in the short-circuit welding period or when the short-circuit welding period is switched to the pulse welding period. As a result, the bead geometry can be precisely controlled with the arc in a stable condition. Thus, this method according to the present invention is industrially applicable.

REFERENCE MARKS IN THE DRAWINGS 1 input power
2 main transformer (transformer)
3 primary rectifier
4 switching unit
5 DCL (reactor)
6 secondary rectifier
7 welding current detector
8 welding voltage detector
9 control switching unit
10 output controller
11 short-circuit welding controller
12 pulse welding controller
13 wire feed speed controller
14 wire feed speed detector
15 calculator
16 arc welding device
17 base material
18 welding wire
19 arc
20 welding tip
21 wire feeder
22 welding condition setter
23 short-circuit welding setter
24 pulse welding setter
25 cooling period setter

The invention claimed is:

1. A method of controlling arc welding with a consumable electrode, the method comprising:
    repeating following periods in sequence:
        a short-circuit welding period to perform short-circuit arc welding;
        a pulse welding period to perform pulse welding; and
        a cooling period in which a welding current output is zero,
    wherein the pulse welding period starts periodically at a constant interval by adjusting a length of the short-circuit welding period in accordance with a length of time from when feeding of a welding wire as the consumable electrode starts until when a short circuit is detected in the short-circuit welding period.

2. The method according to claim 1, wherein a welding voltage output in the cooling period is zero.

3. The method according to claim 1, wherein
    in the short-circuit welding period, a welding wire as the consumable electrode is fed in alternating forward and backward directions at a predetermined cycle; and
    in the pulse welding period, the welding wire is fed at a constant feed speed.

4. The method according to claim 3, wherein while the welding wire is fed in alternating forward and backward directions at the predetermined cycle in the short-circuit welding period, an average feed speed of the welding wire is gradually increased to the constant feed speed set in the pulse welding period.

5. The method according to claim 3, wherein while the welding wire is fed in alternating forward and backward directions at the predetermined cycle in the short-circuit welding period, an average feed speed of the welding wire is increased to the constant feed speed set in the pulse welding period and maintained at the constant feed speed.

6. The method according to claim 1, wherein the length of the short-circuit start welding period is adjusted by controlling a slope of an average feed speed of the welding wire.

7. The method according to claim 1, wherein the length of the short-circuit start welding period is adjusted by changing an inflection point at which an increasing average feed speed of the welding wire is switched to a constant feed speed.

8. The method according to claim 1, wherein
the short-circuit welding period is started when a preceding torch switch signal is turned on and is continued until a predetermined period of time passes, and
while a welding wire is fed in alternating forward and backward directions at a predetermined cycle in the short-circuit welding period, an average feed speed of the welding wire is increased to a constant feed speed set in the pulse welding period so that the pulse welding starts periodically at a constant interval.

9. A method of controlling arc welding with a consumable electrode, the method comprising:
repeating following periods in sequence:
a short-circuit welding period to perform short-circuit arc welding;
a pulse welding period to perform pulse welding; and
a cooling period in which a welding current output is zero,
wherein
the method further comprises a second short-circuit welding period between the pulse welding period and the cooling period,
in the second short-circuit welding period, a welding wire is short-circuited to an object to be welded, and
a length of the second short-circuit welding period is adjusted in accordance with a length of time from when feeding of the welding wire as the consumable electrode starts until when a short circuit is detected in the short-circuit welding period so that the pulse welding period starts periodically at a constant interval.

10. The method according to claim 9, wherein in the second short-circuit welding period, the welding wire is fed in alternating forward and backward directions at a predetermined cycle while an average feed speed of the welding wire is gradually decreased.

11. The method according to claim 1, wherein the cooling period is in a range of 10 ms to 250 ms, both inclusive.

12. The method according to claim 1, wherein
a cooling period at a beginning of welding is shorter than a cooling period during a welding section in continuous welding.

* * * * *